US010232294B2

(12) United States Patent
Dworatzek et al.

(10) Patent No.: US 10,232,294 B2
(45) Date of Patent: Mar. 19, 2019

(54) SEPARATION ELEMENT AND PRESSURE ACCUMULATOR SYSTEM (71) Applicant: Mann+Hummel GMBH, Ludwigsburg (DE)

(72) Inventors: Klemens Dworatzek, Edingen (DE); Janine Schmelzle, Karlsruhe (DE); Goekhan Evcuemen, Hanhofen (DE); Volker Krueger, Leimen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 468 days.

(21) Appl. No.: 14/883,822

(22) Filed: Oct. 15, 2015

(65) Prior Publication Data
US 2016/0121250 A1 May 5, 2016

(30) Foreign Application Priority Data

Oct. 29, 2014 (EP) .................................... 14190796

(51) Int. Cl.
*B01D 46/00* (2006.01)
*B01D 45/04* (2006.01)
*B01D 46/24* (2006.01)

(52) U.S. Cl.
CPC ......... *B01D 46/0005* (2013.01); *B01D 45/04* (2013.01); *B01D 46/003* (2013.01); *B01D 46/2414* (2013.01); *B01D 2257/702* (2013.01); *B01D 2265/021* (2013.01); *B01D 2265/026* (2013.01)

(58) Field of Classification Search
CPC .............. B01D 46/0005; B01D 46/003; B01D 46/0031; B01D 46/2414; B01D 2265/021; B01D 2265/026; B01D 2265/06
See application file for complete search history.

(56) References Cited

U.S. PATENT DOCUMENTS

| | | | |
|---|---|---|---|
| 4,632,682 A | 12/1986 | Erdmannsdorfer | |
| 5,565,094 A | 10/1996 | Zoch et al. | |
| 5,897,676 A * | 4/1999 | Engel ................. | B01D 46/0031 55/428 |

(Continued)

FOREIGN PATENT DOCUMENTS

| | | |
|---|---|---|
| CN | 201162556 Y | 12/2008 |
| CN | 201380018 Y | 1/2010 |

(Continued)

*Primary Examiner* — Robert Clemente
(74) *Attorney, Agent, or Firm* — James Hasselbeck (57) ABSTRACT A separation element for a pressure accumulator system for separating liquid from a media stream is provided with a hollow cylindrical filter body. The filter body has a support body and a coalescing stage filter medium radially outwardly of the support body. The filter body is flowed through radially by the media stream and separates a dirty side from a clean side of the separation element. First and second end disks are disposed on opposite sides of the filter body. A receiving recess is arranged centrally on the first end disk and is open toward the filter body interior. The receiving recess supports the separation element on a central tube of the pressure accumulator system. The second end disk has an outlet opening. Liquid that has been separated by the filter body from the media stream drains via the outlet opening of the second end disk from the separation element.

18 Claims, 8 Drawing Sheets

(56) References Cited

U.S. PATENT DOCUMENTS

| | | | |
|---|---|---|---|
| 8,025,708 B2 | 9/2011 | Heikamp | |
| 9,068,769 B2 | 6/2015 | Tadano | |
| 2005/0092179 A1* | 5/2005 | Barnwell | B01D 46/0031 95/273 |
| 2005/0178716 A1* | 8/2005 | Suri | B01D 29/21 210/437 |
| 2011/0017155 A1* | 1/2011 | Jacob | B01D 46/0031 123/41.86 |
| 2012/0240767 A1 | 9/2012 | Casey | |
| 2015/0338142 A1* | 11/2015 | Price | F04B 17/05 62/468 |

FOREIGN PATENT DOCUMENTS

| | | |
|---|---|---|
| CN | 202360361 U | 8/2012 |
| CN | 203002112 U | 6/2013 |
| EP | 0878227 A2 | 11/1998 |
| JP | 2012086183 A | 5/2012 |

* cited by examiner

SEPARATION ELEMENT AND PRESSURE ACCUMULATOR SYSTEM

BACKGROUND OF THE INVENTION

The invention relates to a separation element for separating a liquid from a gas stream, preferably an air stream, in particular for use as an oil separator element of a pressure accumulator system, and a pressure accumulator system for installing such a replaceable separation element.

Separation elements are typically used for de-oiling air for compressors, in particular in oil-lubricated and oil-cooled screw compressors. In screw compressors it is customary for air to come into contact with oil. The oil is used for sealing, cooling, and lubricating the compressor screw, and is carried along at a rate in the range of 1 to 5 kg per $m^3$. For the de-oiling, separation elements are often used as so-called mist eliminators for separating the oil droplets from the compressed air in such screw compressors. Separation elements such as air de-oiling elements and air de-oiling boxes are used for de-oiling this compressed air, and the separated oil is recirculated into the oil circuit. Air de-oiling boxes often have the design of a spin-on filter including a housing, a cover and a separation element. Air de-oiling elements are separation elements in form of inserts which are inserted into the pressure vessel of compressors.

A device of the air de-oiling element type is known from EP 1 694 424 A1.

A device of the spin-on type for separating oil droplets from air is known from DE 85 01 736 U1. The device is based on an apparatus which is designed as an air dryer for compressed air systems, in particular compressed air brake systems of vehicles, which are rechargeable by a compressor. The device operates with a drying medium which has a limited absorption capacity and which therefore must be frequently regenerated, depending on the amount of liquid in the air to be dried. The device for separating oil droplets from air is designed in such a way that the fully assembled pressure vessel may be brought into the operating position by simply screwing it on, and the collected oil may be continuously discharged.

The separation element is designed as a ring-shaped coalescer which agglomerates the fine oil droplets in a manner known per se to form larger oil droplets, which due to gravity settle in the separation element and downstream therefrom. The separator head is provided with a central standpipe which opens into the exhaust duct for discharging the clean air, and which protrudes beyond a threaded pipe connector at the top, and with same forms an annular gap, which is connected to a separate drainage channel for discharging the separated oil.

To avoid a spurious air stream which could bypass the separation element and adversely affect the separation performance, the separation element has an end disk on the end-face side which is sealed on a cylindrical attachment of the threaded pipe connector via a radially acting sealing ring.

SUMMARY OF THE INVENTION

It is therefore an object of the invention to provide a replaceable separation element for use in a pressure accumulator system, especially a pressure vessel of a compressor, the separation element ensuring a continuous discharge of the separated fluid and allowing simple installation and removal of the separation element in a maintenance-friendly manner.

A further object of the invention, therefore, is to provide a pressure accumulator system for use of such a replaceable separation element.

According to one aspect of the invention, the above-mentioned objects are achieved by a separation element for separating a liquid, especially in form of liquid droplets or aerosol, from a gas stream, in particular an air stream, the separation element including at least one first hollow cylindrical filter body which acts as a coalescer and which includes at least one support body and at least a first filter medium situated radially outwardly of the support body, the filter body separating a dirty side from a clean side of the separation element. In addition, the separation element includes a first end disk and a second end disk which are situated on respective opposite end-face sides of the filter body, and a receiving recess which is situated centrally on one of the two end disks and protrudes into the interior of the filter body.

Favorable embodiments and advantages of the invention result from the further claims, the description, and the drawings.

A separation element for separating a fluid from a media stream, in particular an air stream, is proposed which includes at least one hollow cylindrical filter body which acts as a coalescer, and which includes at least one first support body, and at least a first filter medium provided radially outwardly on the first support body, the filter body separating a dirty side from a clean side of the separation element. In addition, the separation element includes a first end disk and a second end disk which are situated on respective opposite end-face sides of the filter body, and a receiving recess which is situated centrally on one of the two end disks and protrudes into the interior of the filter body. Furthermore, when the separation element is properly installed in a pressure accumulator system, the receiving recess is provided for supporting the separation element on a central tube of the pressure accumulator system and sealing off the central tube in a fluid-tight manner. The filter body is provided for the media stream to flow radially through it, the fluid which is separated in the filter body draining from the separation element via an outlet opening in the second end disk.

The important advantage of the separation element according to the invention lies in the simple and maintenance-friendly design of the connection geometry, and the interfaces with a pressure accumulator system in which the replaceable separation element may be inserted. The separation system is designed essentially as a circular filter system having a multilayer filter body through which a medium, in particular air, may flow radially from the outside to the inside. The filter body is essentially sealed tight at both ends. The filter body has a support body on the inner side which acts as a mechanical support against the flow pressure and which is interrupted by openings, so that the media stream may pass through.

In one preferred embodiment, two successively arranged filter media are used for coalescing and separating a fluid such as oil from an air stream and are situated radially outside the support body.

In one embodiment, a first end disk is provided which is situated at the top and has a receiving recess which projects away axially from the upper end-face side of the filter body and is used for support on a central tube of a pressure accumulator system in which the separation element is inserted. At the same time, the hollow central tube is operable to discharge the cleaned media stream from the separation element. For this purpose, the hollow central tube advantageously has openings through which the media stream may pass into the interior of the central tube. Due to gravity, the separated fluid in the interior of the filter body drops to the bottom end of the filter body, which is closed off by the second end disk, for example, and accumulates at and/or on the second end disk. A collection chamber for the collected fluid may advantageously be provided in the second end disk, preferably formed as a ring-shaped groove which projects away axially from the lower end-face side of the filter body, having a lowest inner surface below the lower end-face side of the filter body. This second end disk has one or more outlet openings through which the separated fluid, for example oil, may drain from the separation element when it has reached a certain level, and may thus be advantageously recirculated into an oil reservoir. Alternatively, the fluid may be drawn off. The one or more outlet openings are preferably positioned in the radial inner wall of the collection chamber. Furthermore, they are preferably positioned in an axial position below the radially outermost edge of the second end disk on the dirty side to make sure that all of the separated liquid flows radially to the inside, preferably to a flange of the support element radially surrounded by the second end disk.

The support body of the filter body may be designed as a metallic structure, while multiply wound plastic and glass fiber nonwovens which take over the function of coalescence and drainage are usually used as filter media. The two end disks of the separation element are produced from a sheet metal, for example.

In a preferred embodiment, the first filter medium is a nonwoven medium made of glass fibers and/or synthetic fibers. It may be folded in a star-shaped manner and radially supported on the support body. Alternatively, it can be wound in one or more layers around the support body.

In one advantageous embodiment, the filter body comprises a second filter medium and preferably a third filter medium. Advantageously, each additional filter medium stage is provided with a separate second and third support body. The second and/or third filter media can be folded in a star-shaped manner and radially supported on the support body. Alternatively, they also may be wound in one or more layers around the respective support body or around the first filter media layer. Also the second and third filter medium is preferably a nonwoven medium made of glass fibers and/or synthetic fibers.

In case more than one filter media is provided, the first filter media can be a coalescing stage in which small liquid droplets are collected on the fibers and bigger droplets exit the media on the other side. The second stage can be used as separation layer, advantageously being oleophobic, to separate the droplets from the gas stream. More preferably, another stage can be used as particle pre-separator for keeping solid particles from blocking the coalescing and separating stage.

The support bodies are preferably provided in cylindrical form (i.e. a tube) and have a plurality of flow openings for the gas stream. This can be achieved with perforated metal plates, expanded metal or plastic sheets or injection molded cylindrical lattices.

In one advantageous embodiment, the first end disk may have a centrally situated grip element for axially fixing the separation element in a properly installed state in a pressure accumulator system. The first end disk, which in the installed state of the separation element is at the top, for example, may be extended upwardly in the axial direction in the form of a support on the inside, for example in the form of the receiving recess for receiving the center tube, which projects away axially from the upper end-face side, in order to form a grip element on the outside of the first end disk which advantageously also has an edge, preferably projecting radially in a ring shape or collar from the grip element, in order to grip the separation element thereon as an installation aid and to enable handling during installation/deinstallation in a pressure accumulator system. In other words, the grip element may be the outside of the receiving recess, and the receiving recess may be the inside of the grip element, and vice versa. The ring shaped collar allows rotational freedom for gripping the grip element. Thus, the terms "receiving recess" and "grip element" may be directed to the same structure. The separation element may also be axially fixed using this grip element by a fixation means provided on the grip element, in that, for example, during closing of a cover of the pressure accumulator system, this cover contacts the grip element on an attachment surface provided on the axial end-face of the grip element and outside of the receiving device and presses on the grip element and thus presses the separation element onto the center tube.

In an alternative embodiment, the grip element may be configured in a way that the gripping area of the grip element is limited to the area of the recess region providing an anti-rotation structure and not configured as a circular collar projecting from the grip element. In particular, the grip element may be prominently cylindrical with the gripping areas being formed on the outside of the grip element by recess regions pointing radially inward into the receiving recess and thus forming the gripping area. By this design a relatively secure handle with a mainly cylindrical shape of the receiving recess is formed in order to be able to grip the separation element by the gripping area of the grip element in a reliable way. For manufacturing reasons a smooth transition area may be formed between a flat surface of the end disk and the recess region, in order to reduce the stress in the sheet metal material of the end disk when forming the recess region by deep drawing the end disk or similar processes of the sheet metal material. Thus the stretching of the sheet metal material can be kept at a relatively low level during forming of the material, thereby reducing the stress in the material. In a preferred embodiment two recess regions for forming the recess regions of the grip element may be located on the circumference of the receiving recess, especially located symmetrically opposite each other and being of the same size, for secure handling of the separation element.

The grip element may advantageously have an integrated anti-rotation structure which is provided for cooperation with a counterstructure situated in a pressure accumulator system. Since a media stream usually flows tangentially against the separation element which is installed in a pressure accumulator system, the separation element has a tendency to rotate during operation, possibly assisted by vibrations which necessarily occur in a compressor. Such rotation over the long term would highly stress a seal used for sealing off the separation element from the pressure vessel of the pressure accumulator system, so that the seal would have only a very limited service life. Such impairment of the separation element may be avoided by using an anti-rotation structure, for example in the form of a flattening of a circular contour of the grip element, which prevents such rotation during operation of the pressure accumulator system.

In one advantageous embodiment, the anti-rotation structure is provided on the receiving recess and the center tube, respectively, wherein the radial inner shape of the receiving recess and the radial outer shape of the upper part of the center tube interlock to create a form fit that prevents the separation element from rotating. This can be achieved by providing at least one cut away region of the circular upper part of the center tube, for example a flat cut away region along a secant through the circular section of the upper part of the center tube, although other shapes like polygonal shapes or segments of a circle are possible. A corresponding contour is preferably provided on the receiving recess and preferably also the grip element located on the outside of the preferably circular receiving recess on the first end disk, respectively. The corresponding contour can be shaped as at least one cut away region of the preferably cylindrical inner volume of the receiving recess, for example a flat cut away along a secant through the circular section of the receiving recess, although other shapes like polygonal shapes or segments of a circle shaped like bites in an apple are possible, respectively. In one preferred combination, two cut away regions are used, respectively. More preferably, the cut away regions on the upper part of the center tube are two flat cut away regions along secants of the circular section of the center tube, especially located symmetrically opposite each other and being of the same size. The cut away regions of the receiving recess, on the other hand, have apple-bite shapes with a circular contour, especially located symmetrically opposite each other and being of the same size, preferably sized to interlock with the cut away regions of the upper part of the center tube. This combination has the advantage that rotation of the separation element can be inhibited and at the same time positioning the receiving recess on the center tube in the right position during service is made easier when replacing the separation element.

According to an alternative embodiment the anti-rotation structure may be configured not as a cut-away region of the grip element but in a way that the grip element also may be the outside of the receiving recess. The receiving recess may exhibit predominantly a cylindrical shape with the anti-rotation structure being formed by recess regions pointing radially inward into the receiving recess and thus forming the anti-rotation structure. Thus, the anti-rotation structure is provided on the receiving recess of the end disk and the counterstructure on the center tube, respectively, wherein the radial inner shape of the receiving recess and the radial outer shape of the upper part of the center tube interlock advantageously to create a form fit that prevents the separation element from rotating. The counterstructure of the anti-rotation structure on the center tube may be achieved by also providing at least one cut away region of the circular upper part of the center tube, for example a flat cut away region along a secant through the circular section of the upper part of the center tube, although other shapes like polygonal shapes or segments of a circle are possible. In a preferred embodiment, two cut away regions may be used, respectively. More preferably, the cut away regions on the upper part of the center tube may be two flat cut away regions along secants of the circular section of the center tube, especially located symmetrically opposite each other and being of the same size. For manufacturing reasons a smooth transition area may be formed between a flat surface of the end disk and the recess region of the end disk by deep drawing the end disk or similar forming processes of the sheet metal material. Thus the stretching of the sheet metal material can be kept at a relatively low level during forming of the material, thereby reducing the stress in the material.

The grip element may advantageously be designed as an installation aid for proper installation/deinstallation in a pressure accumulator system. If the grip element is provided with a contour for gripping with the hand or a tool, i.e., a circular circumferential collar and/or a formation, the separation element may be gripped thereon and lifted. This formation may also have a mushroom-shaped design and protrude beyond the first end-face side of the separation element. It is thus possible to handle the separation element, for example to remove it from a package and insert it into the pressure vessel of a pressure accumulator system, and, even more importantly for replacement of the separation element, to remove it from the pressure vessel. The contour for gripping is preferably located on top of the grip element and axially delimits the outer region of the cut away regions of the grip element on the first end disk, thus providing an extended grip region in the cut away regions, advantageously allowing for more room to grip the separation element and make it easier to remove it from the installation location. Favorably, the grip element may be located on the outside of the first end disk's receiving recess.

In one advantageous embodiment, the second end disk may have a collection chamber for the separated fluid. Due to gravity, the separated fluid in the interior of the filter body drops to the bottom end of the filter body, which is closed off by the second end disk, for example, and accumulates at and/or on the second end disk. A collection chamber for the collected fluid may advantageously be provided on the second end disk. The collection chamber may be designed, for example, in the form of a ring-shaped depression, having a U-shaped cross section in the second end disk, preferably as described above.

In another advantageous embodiment, the second end disk may have an insertion contour for centering during cooperation with a support element of a pressure accumulator system. Such an insertion contour may be designed in cylindrical form or as a truncated cone, for example, so that the separation element may be easily pushed on over a cylindrical or conical support element, which is preferably congruent, of a pressure accumulator system and may thus be fixed in the pressure vessel in a self-centering manner. Integrated guiding of the separation element during insertion into the pressure vessel is ensured in this way. In addition, the seal is thus protected during installation of the separation element. Preferably, the insertion contour is provided by the radial inner wall of the collection chamber, which is preferably cylindrical and can be guided on a corresponding conical part of a support element. Further preferably, during guiding at the insertion contour, the element is also guided on the first end disc, as the central tube is inserted into the receiving recess.

In one advantageous embodiment, the second end disk may also have a spring element for supporting the weight of the separation element in an installed state. Secure bearing of the separation element in a pressure vessel of a pressure accumulator system is thus ensured. In addition, the installation/deinstallation of the separation element is simplified in this way. The separation element may thus be braced against the pressure vessel in that, during closing of the pressure vessel with a cover, this cover is pressed onto the first end disk from above, and the separation element is pressed against a support element mounted on the base of the pressure vessel, thus tensioning the spring element.

Furthermore, the second end disk may advantageously have an integrated seal for sealing the second end disk to a support element of a pressure accumulator system. The seal may be used for especially radially sealing the separation element in the pressure accumulator system, and for sealing off the clean side of the separation element from the dirty side. When the seal, in the form of a form ring or an O-ring, for example, is integrated into the second end disk, secure installation of the separation element with the seal is ensured, and the seal is protected from damage to the greatest extent possible.

In one advantageous embodiment, the seal may be held by the spring element, for example by a ring-shaped collar provided on the spring element projecting radially to the inside and axially supporting the seal. The spring element, which encloses the second end disk as a collar, for example, may have a formation in which the seal is inserted. The seal, as a molded seal, may represent a corresponding negative shape of the formation, or may simply be inserted as an O-ring.

In one advantageous embodiment, the spring element in the installed state may establish an electrical contact with a metallic support element of a pressure accumulator system. An electrical potential difference between the support body of the separation element and the pressure vessel of the pressure accumulator system may be formed due to the media stream in and around the filter body and the associated friction processes in the interior of the pressure accumulator system. Therefore, grounding of the separation element is useful to be able to rule out high potential differences which could possibly represent an operational hazard. Thus, electrical insulation of the separation element and a possibly hazardous potential difference are precluded.

The first end disk may advantageously have a cover contour which reduces accumulation of condensate from the media stream. Thus, it is advantageous when the end disk has a preferably flat, uncurved cover contour so that condensate may easily drain off. Alternatively, a contour which extends radially outwardly at an angle could be advantageous, or discharge channels could be integrated into the end disk. In any event, condensate from the media stream may thus be prevented from accumulating on the first end disk. In general, the upper surfaces on the upper axial end of the separation element should be either horizontal or have a slope descending radially from the center to the radial outer edge.

In another advantageous embodiment, an outer edge of the first and/or second end disk may have an end collar with a hollow cylindrical shape projecting axially in direction towards the other end disk. Such an end collar may additionally be filled with adhesive on the inside, so that the end disks are adhesively bonded to the filter body to form a solid unit. Such a fixed connection also represents a safety feature of such a separation element in order to ensure that neither of the end disks comes loose during operation, which could impair the functioning of the separation process. Reliable separation of fluid may be of great importance for the operational safety of the devices and components which are acted on by the media stream.

According to a further aspect, the invention relates to a pressure accumulator system comprising a replaceable separation element as described above, a pressure vessel with a cover, which during proper use is situated at the upper end and which is removable for replacement of the separation element, the pressure accumulator system further comprising a support element for supporting the separation element, and a central tube which is centrally situated in the support element. The separation element is centrally mountable on the support element by accommodating the central tube in a receiving recess of the separation element, and is axially fixable to the cover after the pressure vessel is closed. In addition, the separation element separates a dirty side from a clean side of the pressure accumulator system. A discharge channel for the separated fluid is preferably integrated into the support element. In operation, the air stream enters the separation element from the dirty side, oil is separated as the air flows through the filter body to the radial inner clean side of the separation element, the cleaned air enters the central tube through at least one inlet opening in the central tube, and afterwards the cleaned air in the central tube is discharged to the clean side outlet.

Such a pressure accumulator system is typically situated at the outlet of air compressors, for example screw compressors, and stores the compressed medium for further use, or provides a certain buffer function for operating connected devices such as sandblasting equipment. The pressure accumulator system according to the invention has all necessary interfaces for accommodating and operating a replaceable separation element as described above. The separation element accommodates the central tube in the pressure vessel of the pressure accumulator system by means of the receiving recess. The separation element is pushed onto the support element via the insertion contour and with the seal which is integrated into the second end disk seals off the clean side from the dirty side. When the pressure vessel is closed by the cover, the pressure of the cover on the grip element situated on the first end disk braces the separation element in the pressure vessel, thus reliably sealing off the clean side from the dirty side for the operation. The separated fluid accumulates in the collection chamber of the second end disk of the separation element, and when a certain minimum height is exceeded, flows through the outlet opening in the second end disk and into the discharge channel of the support element, and may thus drain out of the pressure accumulator system and/or be drawn off. The cleaned media stream exits the pressure accumulator system through the central tube.

BRIEF DESCRIPTION OF THE DRAWINGS

Further advantages result from the following description of the drawings. Exemplary embodiments of the invention are illustrated in the drawings. The drawings, the description, and the claims contain numerous features in combination. Those skilled in the art will also advantageously consider the features individually and combine them into further meaningful combinations.

PREFERRED EMBODIMENTS OF THE INVENTION

Identical or similar components are denoted by the same reference numerals in the figures. The figures merely show examples, and are not to be construed as limiting.

Figure 1:
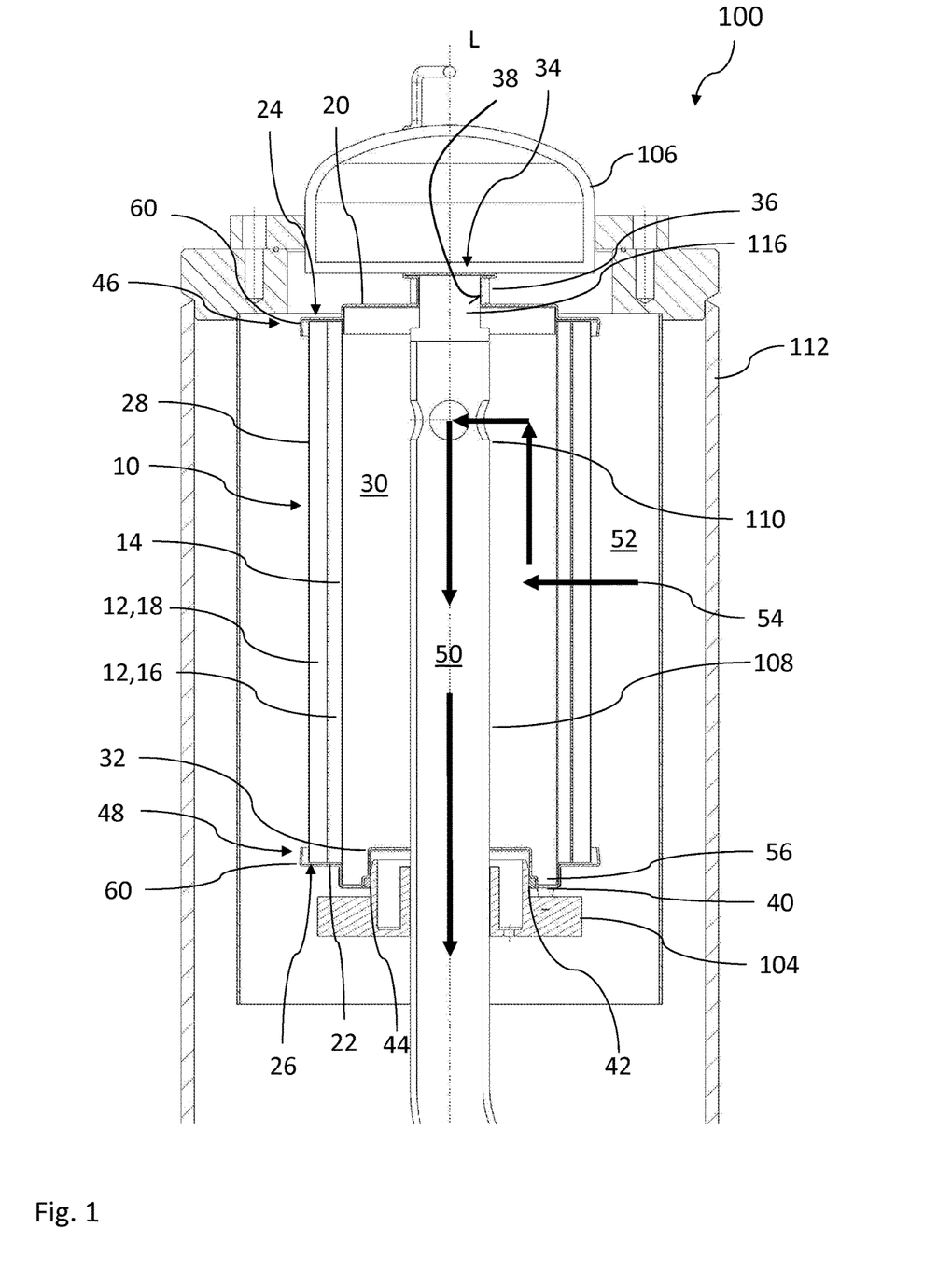
FIG. 1 shows a longitudinal section of a pressure accumulator system with an inserted separation element according to one exemplary embodiment of the invention.

FIG. 1 shows a longitudinal section of a pressure accumulator system 100 with an inserted separation element 10 according to one exemplary embodiment of the invention. The pressure accumulator system 100 with a replaceable separation element 10 includes a pressure vessel 112 having a cover 106, situated at the upper end 116, which is removable for replacing the separation element 10. The cover 106 has a dome-shaped design with a flange which may be screwed on. The pressure accumulator system 100 also includes a support element 104 for supporting the separation element 10, and a central tube 108 which is centrally situated in the support element 104. The separation element 10 is centrally mounted on the support element 104 by accommodating the central tube 108 in a receiving recess 38 of the separation element 10. After the pressure vessel 112 is closed by the cover 106, the separation element 10 is axially fixed by pressing the cover 106 onto the grip element 34 situated in the first end disk 20, and pressing the insertion contour 42 of the separation element 10 onto the support element 104. The separation element 10 thus separates a dirty side 52 from a clean side 50 of the pressure accumulator system 100. A discharge channel 114 for the separated fluid is integrated into the support element 104. In operation, the air stream enters the separation element 10 from the dirty side 52, oil is separated as the air flows through the filter body 12 in flow direction 54 to the radial inner clean side 50 of the separation element 10, the cleaned air then enters the central tube 108 through at least one inlet opening 110 in the central tube 108, and afterwards the cleaned air in the central tube 108 is discharged to the clean side outlet (not shown) of the pressure accumulator system 100.

The separation element 10 for separating a fluid from a media stream, in particular an air stream, includes a hollow cylindrical filter body 12 which acts as a coalescer and which includes at least one support body 14, especially support tube with a plurality of flow openings 110, and includes a radially outwardly situated first filter medium 16, preferably wound around support body 14, and second filter medium 18, preferably wound around a second support body 15, the filter body 12 separating a dirty side 52 from a clean side 50 of the separation element 10. In addition, the separation element 10 includes a first end disk 20 and a second end disk 22 which are situated on respective opposite end-face sides 24, 26 of the filter body 12, and a receiving recess 38 which is situated centrally on the first end disk 20 and for receiving a central tube 108 preferably defined by an inner, hollow receiving space in which the upper end part 116 of the central tube can be received. Furthermore, when the separation element 10 is properly installed in the pressure accumulator system 100, the receiving recess 38 supports the separation element 10 on the central tube 108 of the pressure accumulator system 100. The media stream flows radially through the filter body 12. The liquid, which is separated by the filter body 12, drains from the separation element 10 and/or is drawn off via one or more, especially 3 to 6, outlet openings 32 in the second end disk 22. In the embodiment shown, the upper end part 116 of the central tube 108 is provided as a solid structure, axially closing the central tube 108. As a consequence, the entire volume of cleaned air on the clean side 50 passes through the flow openings 110 into the central tube 108.

Figure 2:
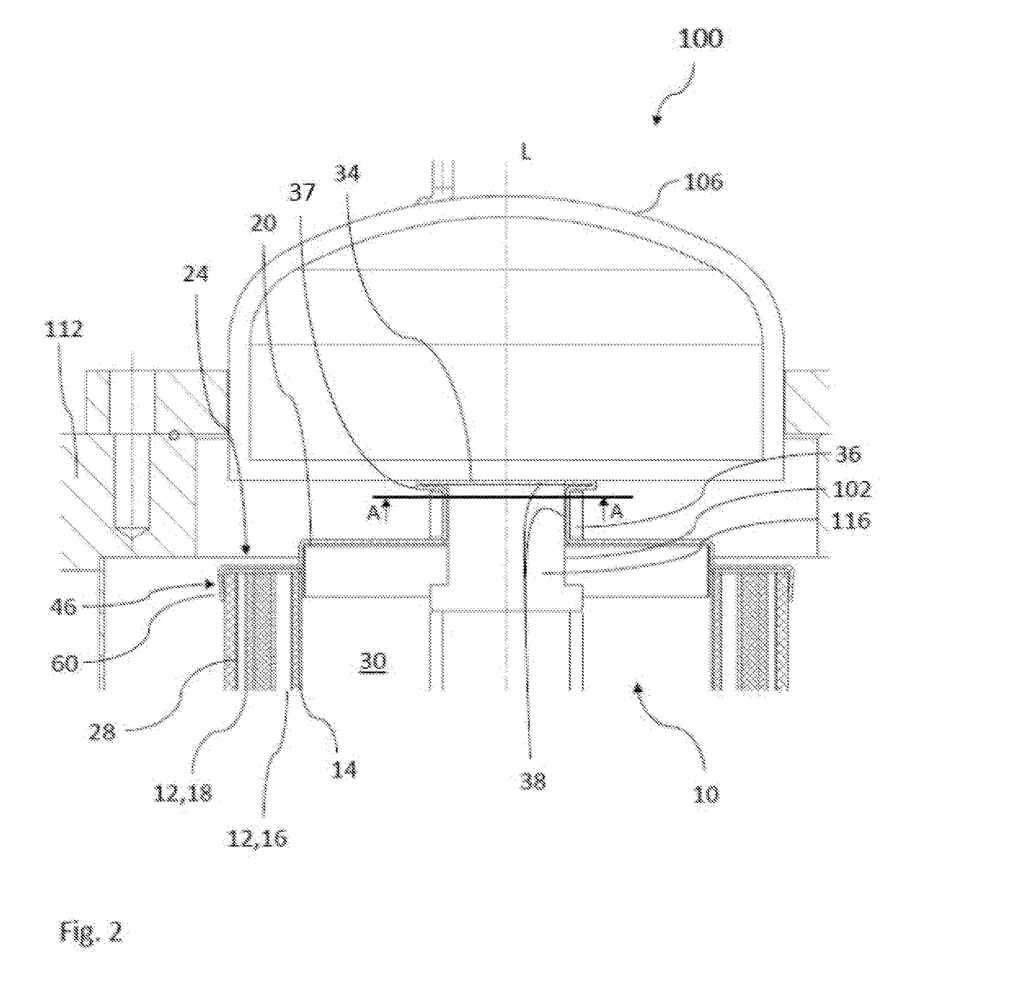
FIG. 2 shows a longitudinal section of the pressure accumulator system with an inserted separation element according to FIG. 1, with a focus on the upper part of the pressure accumulator system.

FIG. 2 shows another longitudinal section of the pressure accumulator system 100 with an inserted separation element 10 according to FIG. 1, with a focus on the upper part of the pressure accumulator system 100.

The first end disk 20 is preferably made from sheet metal and has a centrally situated projection extending axially away from the filter body 12 providing the receiving recess for receiving a central tube 108 by defining an inner, hollow receiving space in which the upper end part 116 of the central tube 108 can be received. On the outside of the receiving space, a grip element 34 is provided for axially fixing the separation element 10 in a properly installed state in a pressure accumulator system 100. This is achieved by axially pressing the cover 106 onto the grip element 34 when the pressure vessel 112 is closed by the cover 106. The grip element 34 is designed as an outer termination of the receiving recess 38. The grip element 34 also has an integrated anti-rotation structure 36 which is provided for cooperation with a counter structure 102 situated on the upper end part 116 of the central tube 108 of a pressure accumulator system 100. In addition, the grip element 34 is designed as an installation aid for proper installation/deinstallation in a pressure accumulator system 100. The separation element 10 may be gripped at the grip element 34 and removed from the pressure vessel 112 or reinserted therein.

The first end disk 20 has a cover contour which reduces accumulation of condensate from the media stream. Thus, it is advantageous when the end disk 20 has a preferably flat, uncurved cover surface so that condensate may easily drain off. Alternatively, a contour which extends radially outwardly at an angle could be advantageous, or discharge channels could be integrated into the end disk 20. In any event, condensate from the media stream may thus be prevented from accumulating on the first end disk 20.

Figure 3:
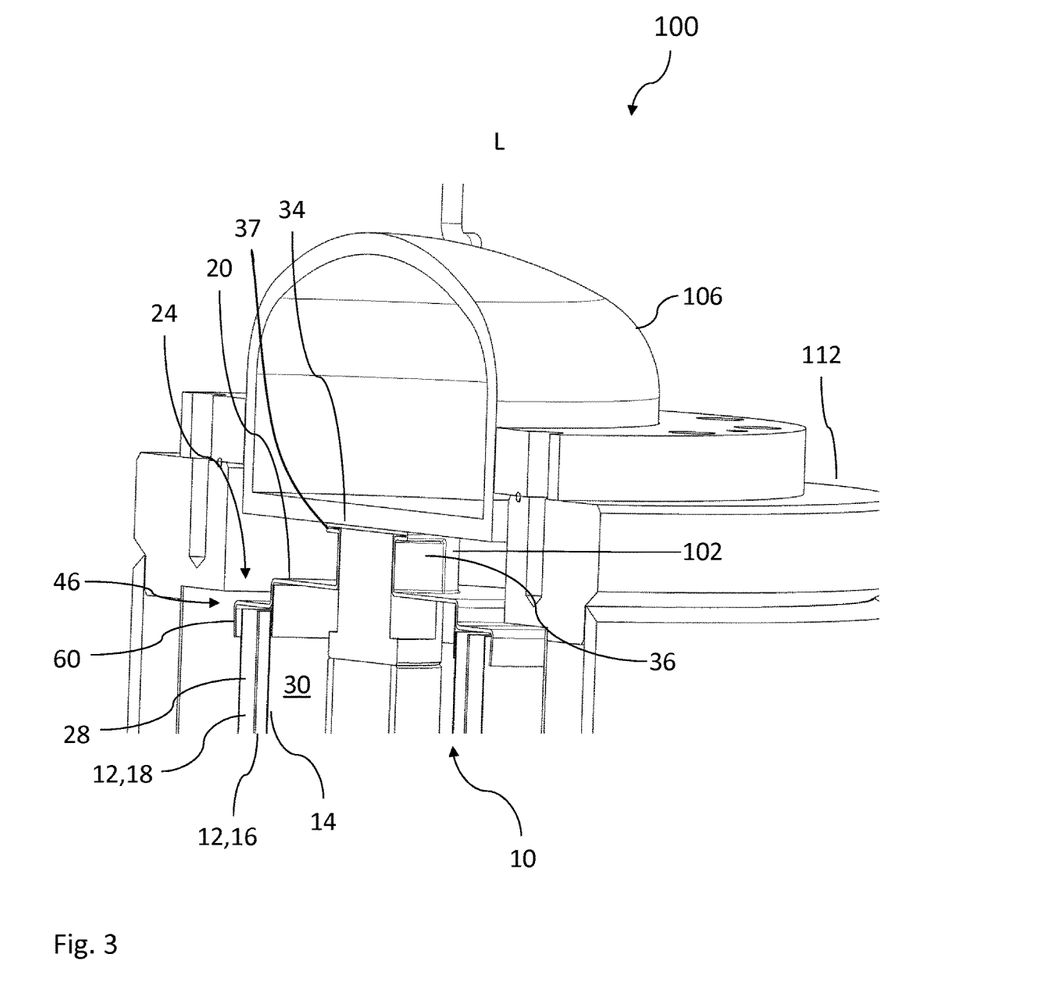
FIG. 3 is an isometric sectional illustration of the pressure accumulator system with an inserted separation element according to FIG. 1, with a focus on the upper part of the pressure accumulator system.

FIG. 3 shows an isometric sectional illustration of the pressure accumulator system 100 with an inserted separation element 10 according to FIG. 1, with a focus on the upper part of the pressure accumulator system 100. The flattening of the anti-rotation structure 36 in the grip element 34 is more clearly apparent in this illustration. The anti-rotation structure 36 cooperates with a corresponding congruent counter structure 102 situated on the upper part 116 of the central tube 108.

In FIG. 3 it is best seen that the grip element 34 may advantageously be designed as an installation aid for proper installation/deinstallation in a pressure accumulator system 100. In this embodiment, the grip element 34 is preferably provided with a contour for gripping with the hand or a tool, in this embodiment formed as part of a circular circumferential collar 37, the separation element may be gripped thereon and lifted. It is thus possible to handle the separation element 10, for example to remove it from a package and insert it into the pressure vessel 112 of a pressure accumulator system 100, and, even more importantly, for removing the separation element 10 from the pressure vessel 112. The contour for gripping is preferably located on top of the grip element 34 and axially delimits the outer region of the cut away regions of the anti-rotation structure 36 of the grip element 34 on the first end disk 20, thus providing a grip region in the cut away regions, advantageously allowing for room to grip the separation element 10 and make it easier to remove it from the installation location. It is understood that the term "cut away regions" does not necessarily mean that material is cut away. In the embodiment shown with a sheet metal upper end disk 20, the cut away regions 35 are made by plastically forming the sheet metal in radial direction in the two opposite positions from a pure cylindrical form into a mainly cylindrical form with two opposite recesses 35 which again may have the form of a part of a cylinder, respectively. Thus, by this one deforming process, the anti-rotation structure 36 including the grip region of the grip element 34 is created.

Figure 4:
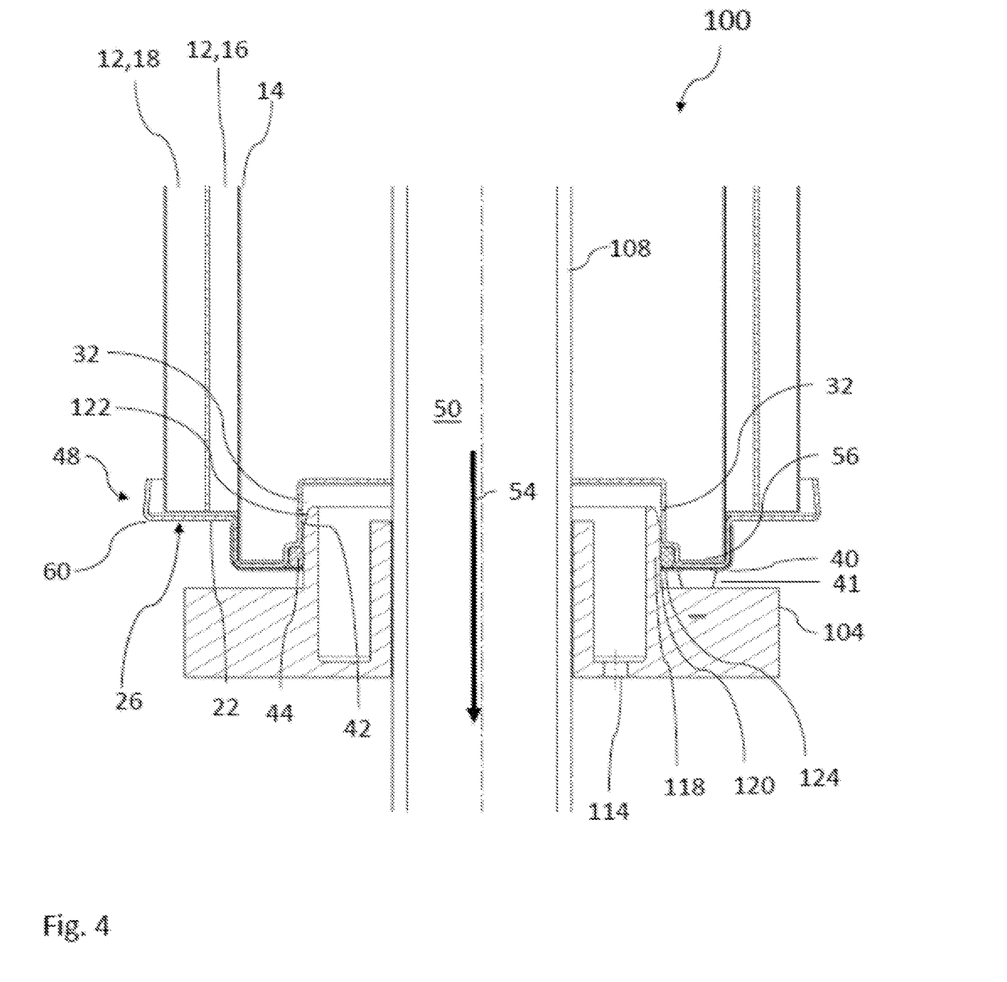
FIG. 4 is a longitudinal section of the pressure accumulator system with an inserted separation element according to FIG. 1, with a focus on the lower part of the pressure accumulator system.

FIG. 4 illustrates a longitudinal section of the pressure accumulator system 100 with an inserted separation element 10 according to FIG. 1, with a focus on the lower part of the pressure accumulator system 100.

The second end disk 22 has a collection chamber 56 for the separated fluid. The separated fluid drops into the area of the second end disk 22 of the separation element 10, and accumulates there in the collection chamber 56, which is designed as an annular recess in the form of a groove. The collection chamber 56 is radially delimited on one side by a radial inner wall 42 projecting into the separation element 10 and comprising outlet openings 32. If the separated liquid exceeds a certain height, it may flow through the outlet openings 32 into the discharge channel 114 of the support element 104, and may thus drain and/or be drawn off from the pressure accumulator system 100. The one or more outlet openings 32 are preferably positioned in the radial inner wall 42 of the collection chamber 56. Furthermore, they are preferably positioned in an axial position below the radially outermost edge 48 of the second end disk 22 on the dirty side 52 to make sure that all of the separated liquid flows radially to the inside to the flange 118 provided on the support element 104 and radially surrounded by the second end disk 22. As an alternative to flow openings 32, the liquid outlet level can also be defined by the axial uppermost radial outer edge of the second end disk 22.

The second end disk 22 has an insertion contour provided by the inner wall 42, the seal 44 and a ring-shaped collar 124 for centering during cooperation with a support element 104 of a pressure accumulator system 100. As shown in FIG. 4, the insertion contour 42 is preferably designed in generally cylindrical form in such a way that the separation element 10 may be easily pushed over the flange 118 of support element 104, which as shown in FIG. 4 has preferably a cylindrical sealing surface 120 and a conical ramp surface 122 at its axial upper end for guiding the insertion contour 42. The seal 44 is located in a sealing groove in wall 42, wherein the wall 42 delimits the groove in radial outer and axial upper direction. On the axial lower end of the end disk 22, a separate ring-shaped sealing holder delimits the sealing groove. The ring-shaped sealing holder may be part of a sheet metal spring element 40 which is described in more detail below. The separation element 10 may thus be fixed in the pressure vessel 112 in a self-centering manner. Integrated guiding of the separation element 10 during insertion into the pressure vessel 112 is ensured in this way. In addition, the seal 44 is thus protected during installation of the separation element 10 by the ring-shaped sealing holder. In the embodiment shown, the second end disk 22 has an integrated seal 44 provided in form of an O-Ring for sealing during cooperation with the sealing surface 120 of flange 118 of support element 104 of the pressure accumulator system 100, the seal being held in an annular groove in the second end disk 22 by means of the spring element 40 described below.

The second end disk 22 has a spring element 40 for supporting the weight of the separation element 10 in an installed state. The spring element 40 rests against the lower edge of the second end disk 22 as a collar-shaped contour, and supports the actual spring tabs 41 on the support element 104.

The spring element 40 in the installed state establishes an electrical contact with the metallic support element 104 of the pressure accumulator system 100. An electrical potential difference between the support body 14 of the separation element 10 and the pressure vessel 112 of the pressure accumulator system 100 may be formed due to the media stream in and around the filter body 12 and the associated friction processes in the interior 30 of the pressure accumulator system 100. Therefore, grounding of the separation element 10 is useful to be able to rule out high potential differences which could possibly represent an operational hazard. Thus, electrical insulation of the separation element 10 and a possibly hazardous potential difference are precluded.

Figure 5:
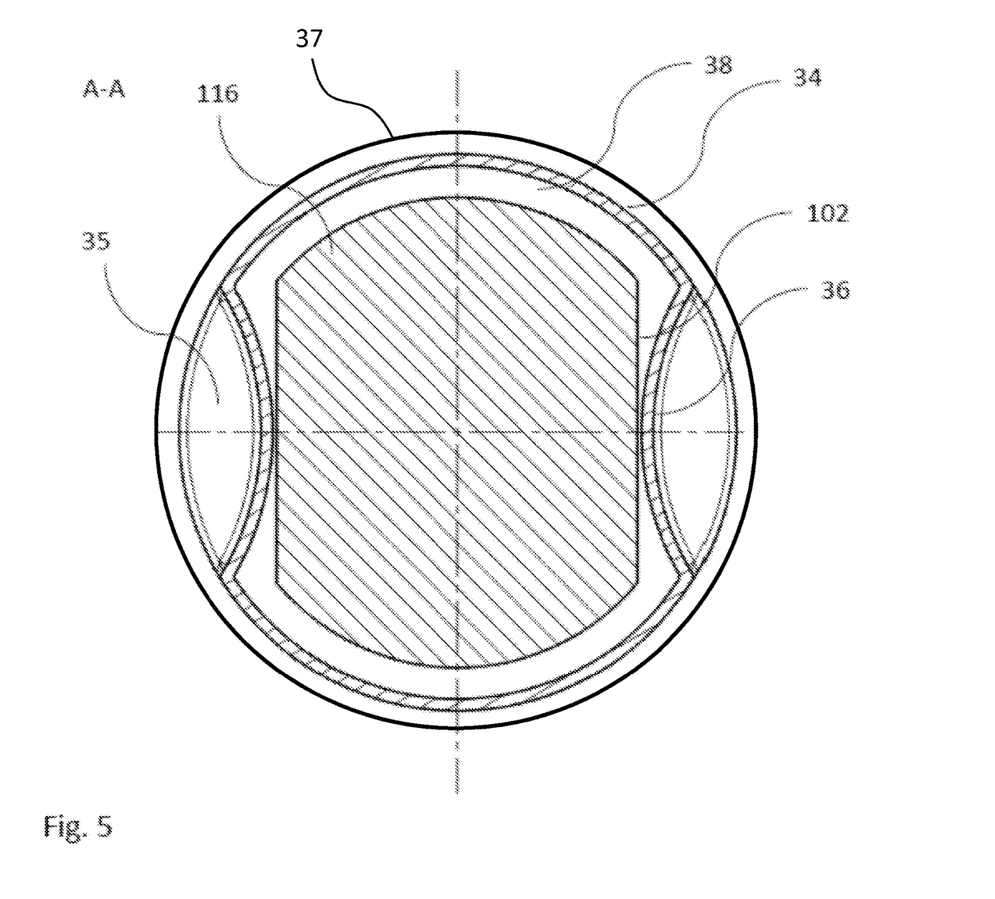
FIG. 5 shows a horizontal section through one embodiment of the interface region of the upper part of the center tube and the receiving recess including grip element, viewing direction is upwards.
Figure 6:
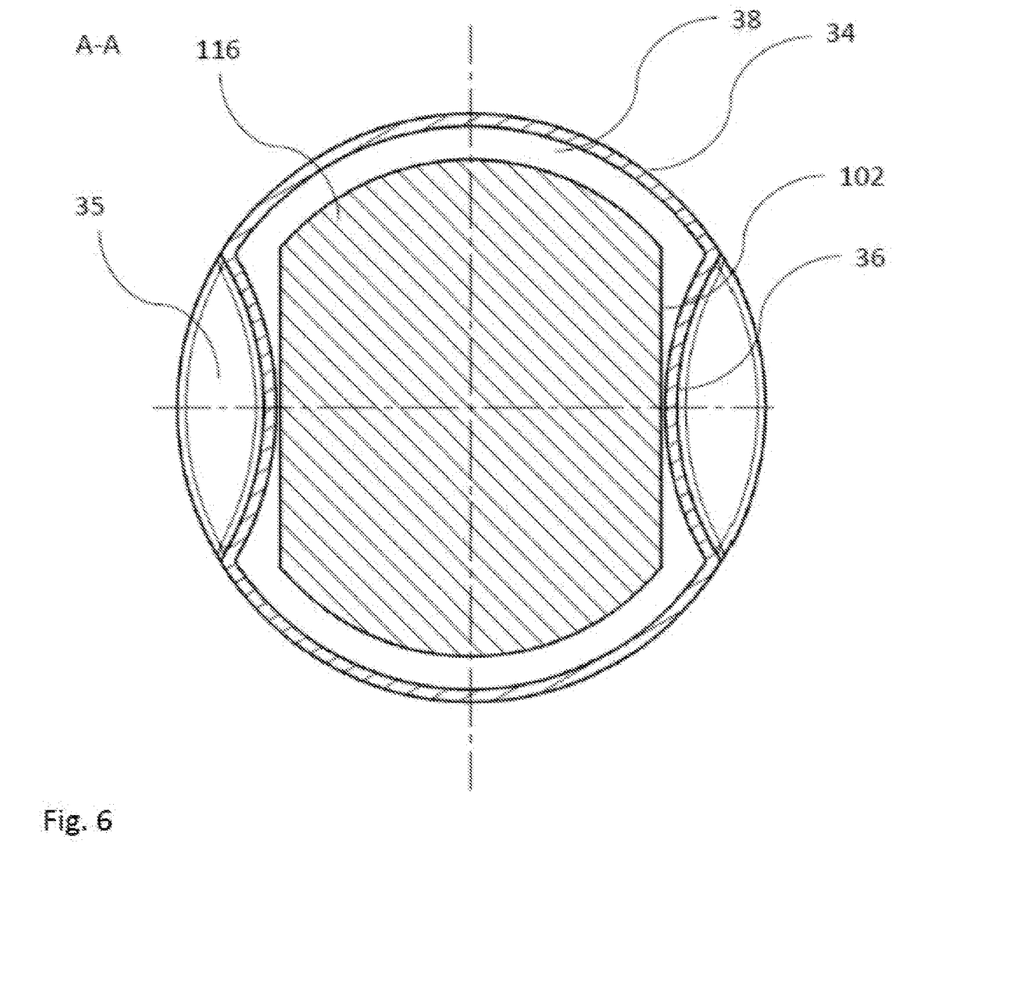
FIG. 6 shows a horizontal section through an alternative embodiment of FIG. 5 of the interface region of the upper part of the center tube and the receiving recess including grip element, viewing direction is upwards.

FIGS. 5 and 6 show a horizontal section through example embodiments of the interface region of the upper part 116 of the center tube and the receiving recess 38 including the grip element 34 along plane A-A shown in FIG. 2. The viewing direction is vertically upwards. In this view, the interaction of anti-rotation structure 36 cooperating with the corresponding counter structure 102 becomes clearly visible. It is clear that turning the grip element 34 is not possible in this position as the position of the anti-rotation structure 36 having the recess region 35 is fixed by the corresponding counter structure 102. The upper part 116 of the center tube 108 (FIG. 1) is a solid part with a cylindrical shape. On the left and opposite right side, flattened cut away regions are provided as anti-rotation counter structures 102. The anti-rotation structures 36 on the grip element 34 and in the receiving recess 38, respectively, are embossed recesses, for example shaped as parts of a circle with a center outside the geometry of the grip element 34, although other forms are possible. As shown in FIG. 5 the grip element 34 may provide a surrounding circular collar 37 allowing for rotational freedom for gripping the grip element 34.

Alternatively, as shown in FIG. 6, the grip element 34 may provide no such surrounding collar but may be gripped at the recess regions 35 solely. Such a configuration may be applicable in the example embodiment described below.

Figure 7:
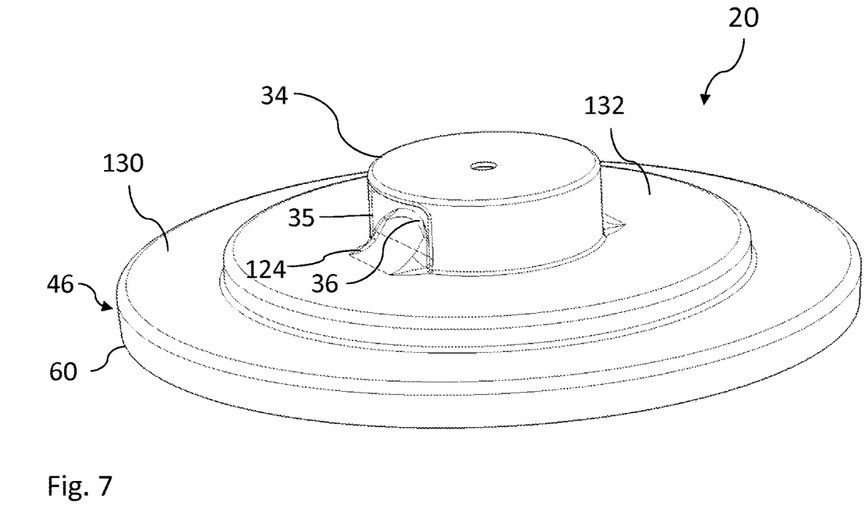
FIG. 7 is an isometric view of a first end disk of a separation element according to a further exemplary embodiment of the invention.

FIG. 7 shows an isometric view of a first end disk 20 of a separation element 10 according to a further exemplary embodiment of the invention. The end disk 20 illustrated in FIG. 6 is distinguished from the end disk 20 of the exemplary embodiment of FIGS. 1 to 5 mainly by the design of the grip element 34 as well as the transition area 124 between the flat surface 122 and the top of the grip element 34. The end disk 20 in FIG. 6 as well is preferably provided with a contour for gripping with the hand or a tool, but in this embodiment the gripping area at the outside is limited to the recess region 35 which provides the anti-rotation structure 36 at the inside. The recess region 35 comprises a smooth transition area 124 extending from the flat surface 122 to the radially innermost point of the recess region 35, the transition area 124 having a relatively big radius. The radius of the transition area 124 is of advantage concerning manufacturing of the first end disk 20, particularly forming the area of the anti-rotation structure 36. Thus the stretching of the sheet metal material can be kept at a relatively low level during forming of the material, thereby reducing the stress in the material.

The separation element 10 may be gripped at the grip element 34 and lifted. It is thus possible to handle the separation element 10, for example to remove it from a package and insert it into the pressure vessel 112 of a pressure accumulator system 100, and, even more important, it is possible to remove the separation element 10 from the pressure vessel 112. The contour for gripping is again located at the top of the grip element 34 and axially delimits the outer region of the recess region 35 of the anti-rotation structure 36 of the grip element 34 on the first end disk 20, thus providing a grip region in the recess region 35, advantageously allowing for room to grip the separation element 10 and make it easier to remove it from the installation location. In the embodiment shown in FIG. 6 with a sheet metal upper end disk 20, the two recess regions 35 are made by plastically forming the sheet metal in radial direction in the two opposite positions from a pure cylindrical form into a mainly cylindrical form with two opposite recesses 35 which are formed by a smooth transition region 124 from the flat surface 122 to the top of the innermost radius of the recess regions 35. Thus, by this one deforming process, the anti-rotation structure 36 including the grip region of the grip element 34 is formed in relatively straight-forward and economic way, ensuring for low material stresses and high lifetime of the end disk 20. The grip region on the outer circumference of the grip element 34 thus corresponds to the anti-rotation structure 36 on the radially inner surface of the grip element 34.

The first end disk 20 of the embodiment shown in FIG. 7 also has a cover contour which reduces accumulation of condensate from the media stream. Advantageously, the end disk 20 has a preferably flat, uncurved cover surface, formed by two flat surfaces 120, 122 with a step from the first surface 120 to the second surface 122, so that condensate may easily drain off. Alternatively, the two surface 120, 122 may exhibit a contour which extends radially outwardly at an angle, or discharge channels could be integrated into the end disk 20. In any event, condensate from the media stream may thus be prevented from accumulating on the first end disk 20. Designing the first end disk 20 formed as a cover with two flat surfaces 120, 122, separated by a step is advantageous concerning packaging the cylindrical filter body 12 with the first and the second filter medium 16, 18, respectively.

Figure 8:
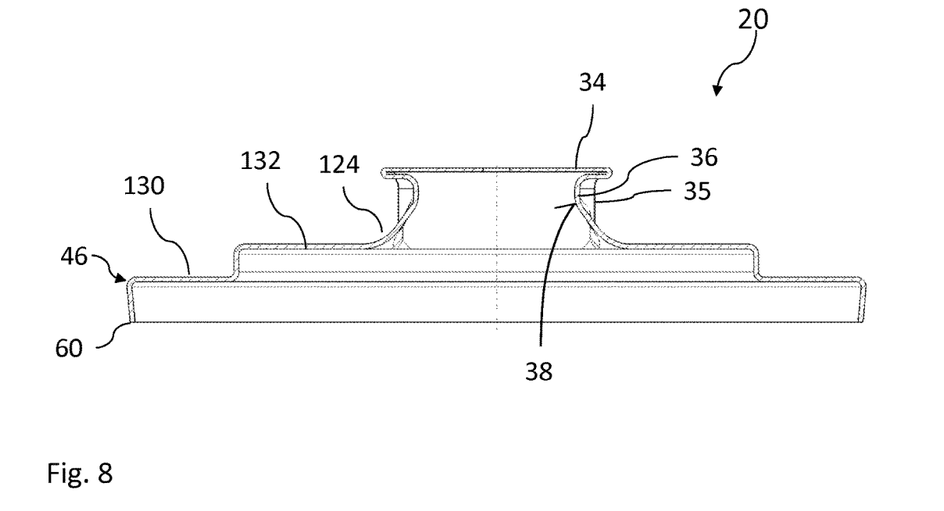
FIG. 8 is a longitudinal section of the first end disk according to FIG. 7.

In FIG. 8 a longitudinal section of the first end disk 20 according to FIG. 7 is shown. The recess regions 35 with the innermost radius of the anti-rotation structure 36 in the grip element 34 are more clearly apparent in this illustration. The grip element 34 is represented as the outer side of the receiving recess 38 of the center tube 108 of a pressure accumulator system 100. The anti-rotation structure 36 cooperates with a corresponding congruent counter structure 102 located on the upper part 116 of the central tube 108. In FIG. 8 the contour of the end disk 20 adapted for a secure grip of the grip element 34 for handling, as inserting the separation element 10 into the pressure vessel 112 of the pressure accumulator system 100 or removing it from the pressure vessel 112, is clearly illustrated. Also at the outer edge 46 of the end disk 20 the radially inwardly angled bend 60 of the end disk 20 as a sealing contact with respect to the filter body 12 is clearly distinguishable. The space between the inwardly angled bend 60 and the filter medium 18 of the filter body 12 may additionally be filled with an adhesive in order to achieve a fluid-sealed contact.

Figure 9:
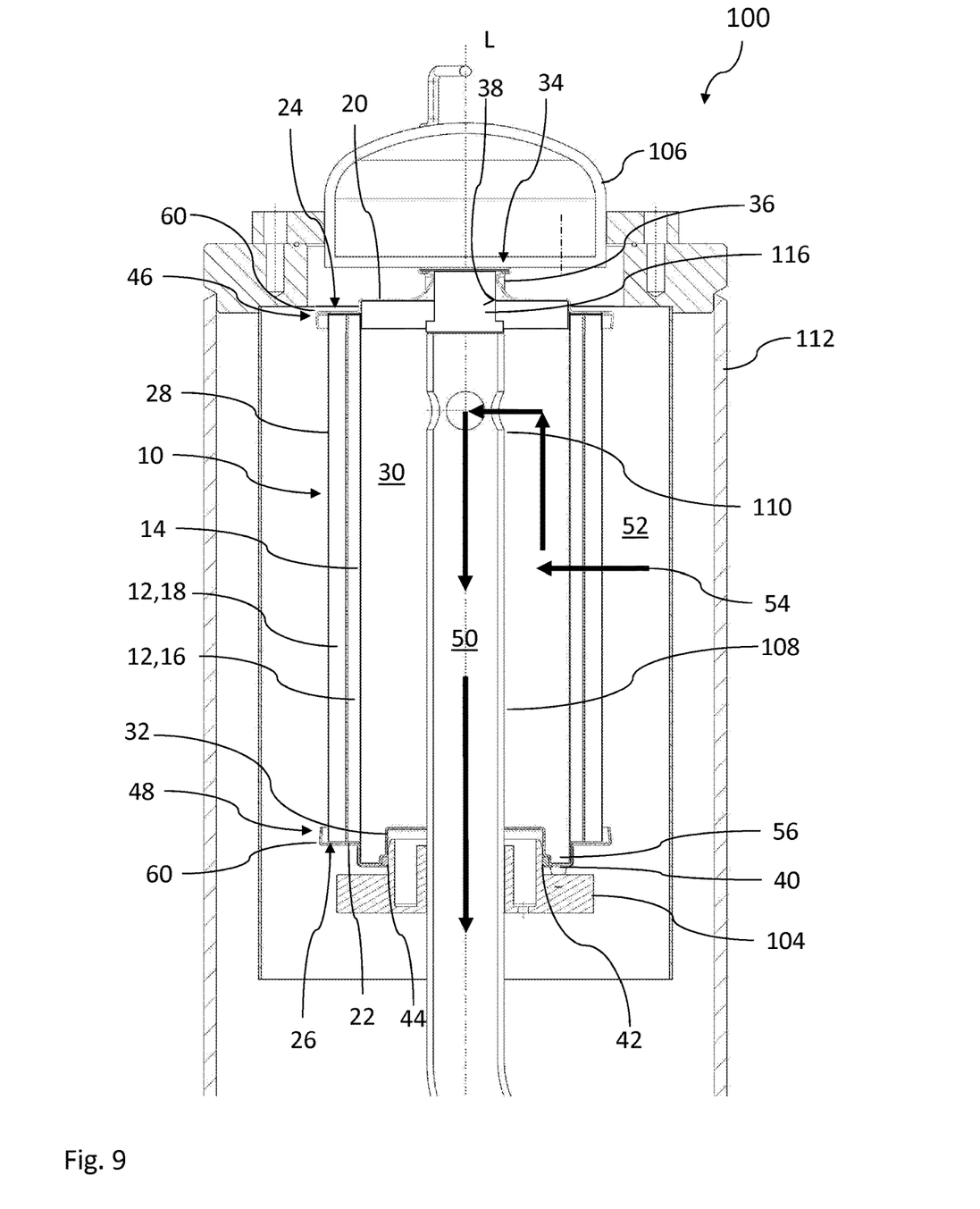
FIG. 9 is a longitudinal section of a pressure accumulator system with an inserted separation element with the first end disk shown in FIGS. 7 and 8 according to a further exemplary embodiment of the invention.

FIG. 9 illustrates a longitudinal section of a pressure accumulator system 100 with an inserted separation element 10 with the first end disk 20 shown in FIGS. 7 and 8 according to a further exemplary embodiment of the invention. The embodiment of the pressure accumulator system 100 shown in FIG. 9 is distinguished from the embodiment of the pressure accumulator system 100 shown in FIG. 1 by the different design of the first end disk 20 of the separation element 10 featuring the different design of the grip region of the grip element 34 as the outer side of the anti-rotation structure 36 as well as the transition area 124 between the flat surface 122 to the top of the grip element 34. It is thus advantageously possible to handle the separation element 10, for example to remove it from a package and insert it into the pressure vessel 112 of a pressure accumulator system 100, and, even more important, it is possible to remove the separation element 10 from the pressure vessel 112.

The anti-rotation structure 36 in the design realized in the particular embodiment of the end disk 20 of FIGS. 7 and 8 favorably prevents the separation element 10 from being rotated in the pressure vessel 112 by fluid motion and/or vibrations during operating the pressure accumulator system 100.

While specific embodiments of the invention have been shown and described in detail to illustrate the inventive principles, it will be understood that the invention may be embodied otherwise without departing from such principles.

What is claimed is:

1. A separation element for a pressure accumulator system for separating a liquid from a media stream, the separation element comprising:
   at least one hollow cylindrical filter body acting as a coalescer, the at least one filter body comprising at least one support body and at least one first coalescing stage filter medium disposed radially outwardly of the at least one support body, the at least one filter body configured to be flowed through radially by the media stream and configured to separate a dirty side from a clean side of the separation element;
   a first end disk and a second end disk of an electrically conductive metal material, disposed on opposite end-face sides of the at least one filter body;
   wherein the first end disk has:
      an inside which faces an interior of the at least one filter body;
      an outside arranged opposite the inside and facing outwardly away from the at least one filter body;
      a grip element formed as a hollow tubular projection having a radial outer wall, projecting axially outwardly on the outside of the first end disk, the hollow projection having:
         a receiving recess formed by an radial interior of the hollow tubular projection of the grip element, the receiving recess arranged centrally on the first end disk, the receiving recess at a first end being open toward the interior of the at least one filter body;
         wherein the radial outer wall has at least one radially inwardly recessed region, projecting into the interior of the hollow tubular projection of the grip element, forming a grip region for grasping the separation element;
         wherein the grip element is adapted as an installation aid to enable handling of the separation element during installation/deinstallation in the pressure accumulator system;

wherein the receiving recess is configured to receive an end portion of a central tube of the pressure accumulator system; and a radially extending support surface arranged at a second end of the receiving recess and extending radially inwardly into the interior of the hollow tubular projection, the support surface configured to rest against the end portion of the central tube within the receiving recess, to support the separator element in the pressure accumulator system;

the second end disk comprising at least one outlet opening;

wherein, when the separation element is in a properly installed state in the pressure accumulator system, the liquid which is separated by the at least one filter body from the media stream drains from the separation element via the at least one outlet opening in the second end disk.

2. The separation element according to claim 1, wherein the grip element is configured to axially fix the separation element in the properly installed state in the pressure accumulator system.

3. The separation element according to claim 2, wherein the grip element comprises an integrated anti-rotation structure configured to cooperate with a counterstructure provided in the pressure accumulator system.

4. The separation element according to claim 2, wherein the radially inwardly recessed region of the grip element comprises a smooth transition area extending from a surface of the first end disk to a radially innermost point of the at least one radially inwardly recessed region.

5. The separation element according to claim 1, wherein the second end disk comprises a central opening adapted for receiving a central tube of the pressure accumulator system into an interior of the at least one filter body;

an annular collection chamber formed in the second end disk as an annular recess or annular groove opening into the interior of the at least one filter body, the annular collection chamber surrounding the central opening, the second end disk at the annular collection chamber having:

at least one outlet opening adapted to drain fluid from the annular collection chamber through the second end disk, the at least one outlet opening spaced radially away from the central opening.

6. The separation element according to claim 1, wherein the second end disk comprises an insertion contour that centers the second end disk on a support element of the pressure accumulator system.

7. The separation element according to claim 1, further comprising a spring element supporting the weight of the separation element in the installed state, wherein the spring element is arranged on the first end disk or on the second end disk.

8. The separation element according to claim 7, wherein the second end disk comprises an integrated seal that seals relative to a support element of a pressure accumulator system.

9. The separation element according to claim 7, wherein the first end disk comprises a cover contour that reduces accumulation of condensate from the media stream.

10. The separation element according to claim 1, wherein the first end disk comprises an outer edge with a radially inwardly angled bend forming a sealing contact with respect to the at least one filter body.

11. The separation element according to claim 1, wherein the second end disk comprises an outer edge with a radially inwardly angled bend forming a sealing contact with respect to the at least one filter body.

12. A separation element for a pressure accumulator system for separating a liquid from a media stream, the separation element comprising:

at least one hollow cylindrical filter body acting as a coalescer, the at least one filter body comprising at least one support body and at least one first coalescing stage filter medium disposed radially outwardly of the at least one support body, the at least one filter body configured to be flowed through radially by the media stream and configured to separate a dirty side from a clean side of the separation element;

a first end disk and a second end disk of an electrically conductive metal material, disposed on opposite axial end-face sides of the at least one filter body;

wherein the first end disk has:

an inside which faces an interior of the at least one filter body;

an outside arranged opposite the inside and facing outwardly away from the at least one filter body;

a grip element arranged on and fixed to the outside of the first end disk, and projecting axially outwardly from the outside of the first end disk;

wherein the grip element is adapted as an installation aid to enable handling of the separation element during installation/deinstallation in the pressure accumulator system;

the second end disk comprising at least one outlet opening;

wherein, when the separation element is in a properly installed state in the pressure accumulator system, the liquid which is separated by the at least one filter body from the media stream drains from the separation element via the at least one outlet opening in the second end disk;

the separation element further comprising:

an electrically conductive spring element supporting the weight of the separation element in the installed state, wherein the spring element is arranged on the first end disk or on the second end disk;

wherein the second end disk comprises an integrated seal that seals relative to a support element of a pressure accumulator system;

wherein the seal is held by the spring element.

13. The separation element according to claim 12, further comprising:

a receiving recess that is arranged centrally on an inside of the first end disk, the inside facing an interior of the at least one filter body and the receiving recess being open toward the interior of the at least one filter body, the receiving recess configured to support the separation element on a central tube of the pressure accumulator system.

14. The separation element according to claim 12, wherein the second end disk includes:

a central opening adapted for receiving a central tube of the pressure accumulator system into an interior of the at least one filter body;

an annular collection chamber formed in the second end disk as an annular recess or annular groove opening into the interior of the at least one filter body, the annular collection chamber surrounding the central opening, the second end disk at the annular collection chamber having:

at least one outlet opening adapted to drain fluid from the annular collection chamber through the second end disk, the at least one outlet opening spaced radially away from the central opening.

15. A separation element for a pressure accumulator system for separating a liquid from a media stream, the separation element comprising:

at least one hollow cylindrical filter body acting as a coalescer, the at least one filter body comprising at least one support body and at least one first coalescing stage filter medium disposed radially outwardly of the at least one support body, the at least one filter body configured to be flowed through radially by the media stream and configured to separate a dirty side from a clean side of the separation element;

a first end disk and a second end disk of an electrically conductive metal material, disposed on opposite axial end-face sides of the at least one filter body;

wherein the first end disk has:

an inside which faces an interior of the at least one filter body;

an outside arranged opposite the inside and facing outwardly away from the at least one filter body;

a grip element arranged on and fixed to the outside of the first end disk, and projecting axially outwardly from the outside of the first end disk;

wherein the grip element is adapted as an installation aid to enable handling of the separation element during installation/deinstallation in the pressure accumulator system;

the second end disk comprising at least one outlet opening;

wherein, when the separation element is in a properly installed state in the pressure accumulator system, the liquid which is separated by the at least one filter body from the media stream drains from the separation element via the at least one outlet opening in the second end disk;

the separation element further comprising:

a spring element supporting the weight of the separation element in the installed state, wherein the spring element is arranged on the first end disk or on the second end disk;

wherein the spring element in the installed state establishes an electrical contact with a metallic support element of the pressure accumulator system.

16. The separation element according to claim 15, further comprising:

a receiving recess that is arranged centrally on an inside of the first end disk, the inside facing an interior of the at least one filter body and the receiving recess being open toward the interior of the at least one filter body, the receiving recess configured to support the separation element on a central tube of the pressure accumulator system.

17. The separation element according to claim 15, wherein the second end disk includes:

a central opening adapted for receiving a central tube of the pressure accumulator system into an interior of the at least one filter body;

an annular collection chamber formed in the second end disk as an annular recess or annular groove opening into the interior of the at least one filter body, the annular collection chamber surrounding the central opening, the second end disk at the annular collection chamber having:

at least one outlet opening adapted to drain fluid from the annular collection chamber through the second end disk, the at least one outlet opening spaced radially away from the central opening.

18. A pressure accumulator system comprising:

a replaceable separation element comprising:

at least one hollow cylindrical filter body acting as a coalescer, the at least one filter body comprising at least one support body and at least one first coalescing stage filter medium disposed radially outwardly of the at least one support body, the at least one filter body configured to be flowed through radially by the media stream and configured to separate a dirty side from a clean side of the separation element;

a first end disk and a second end disk disposed on opposite end-face sides of the at least one filter body;

a receiving recess that is arranged centrally on an inside of the first end disk, the inside facing an interior of the at least one filter body and the receiving recess being open toward the interior of the at least one filter body, the receiving recess configured to support the separation element on a central tube of the pressure accumulator system; and the second end disk comprising at least one outlet opening; and wherein, when the separation element is in a properly installed state in the pressure accumulator system, the liquid which is separated by the at least one filter body from the media stream drains from the separation element via the at least one outlet opening in the second end disk;

a pressure vessel;

a support element arranged in the pressure vessel;

a central tube centrally arranged in the support element and comprising an inlet opening;

the pressure vessel comprising a cover, the cover, during proper use of the pressure accumulator system, arranged at the upper end of the pressure vessel and configured to be removable;

the separation element centrally mounted on the support element by accommodating the central tube in the receiving recess of the separation element;

the separation element axially fixed in the pressure vessel by the cover when the cover closes off the pressure vessel;

the separation element separating a dirty side from a clean side of the pressure accumulator system;

the support element comprising a discharge channel for liquid that has been separated from a media stream by the separation element;

the media stream entering the central tube via the inlet opening after having passed through the separation element from the dirty side to the clean side and the media stream discharged via the central tube to the clean side of the pressure accumulator system.

* * * * *